(12) United States Patent
Yasoshima

(10) Patent No.: US 8,307,018 B2
(45) Date of Patent: Nov. 6, 2012

(54) METHOD FOR MANAGING FILE USING NETWORK STRUCTURE, OPERATION OBJECT DISPLAY LIMITING PROGRAM AND RECORDING MEDIUM

(76) Inventor: Hiroyuki Yasoshima, Hirakata (JP)

( * ) Notice: Subject to any disclaimer, the term of this patent is extended or adjusted under 35 U.S.C. 154(b) by 0 days.

(21) Appl. No.: 12/907,361

(22) Filed: Oct. 19, 2010

(65) Prior Publication Data

US 2011/0035422 A1    Feb. 10, 2011

Related U.S. Application Data

(62) Division of application No. 10/513,974, filed as application No. PCT/JP03/11289 on Sep. 3, 2003, now Pat. No. 7,877,425.

(30) Foreign Application Priority Data

Sep. 5, 2002  (JP) .................................. 2002-259635

(51) Int. Cl.
    *G06F 7/00*  (2006.01)
(52) U.S. Cl. ........................................ 707/822; 707/831
(58) Field of Classification Search ........... 707/821–831
    See application file for complete search history.

(56) References Cited

U.S. PATENT DOCUMENTS

| 5,333,315 A * | 7/1994 | Saether et al. ......... 707/999.001 |
| 5,528,735 A | 6/1996 | Strasnick et al. |
| 5,706,510 A | 1/1998 | Burgoon |
| 5,771,379 A | 6/1998 | Gore, Jr. |
| 5,832,527 A | 11/1998 | Kawaguchi |
| 5,987,469 A * | 11/1999 | Lewis et al. ............ 707/999.102 |
| 6,094,684 A | 7/2000 | Pallmann |
| 6,640,145 B2 | 10/2003 | Hoffberg et al. |
| 2002/0057269 A1 * | 5/2002 | Barber et al. .................. 345/418 |
| 2002/0162013 A1 | 10/2002 | Burnett et al. |
| 2002/0165864 A1 | 11/2002 | Azagury et al. |
| 2003/0052927 A1 * | 3/2003 | Barksdale et al. ............ 345/854 |
| 2004/0177319 A1 | 9/2004 | Horn |
| 2004/0193672 A1 | 9/2004 | Samji et al. |
| 2004/0230599 A1 | 11/2004 | Moore et al. |
| 2006/0036568 A1 | 2/2006 | Moore et al. |

FOREIGN PATENT DOCUMENTS

| JP | 63-124147 | 5/1988 |
| JP | 07-121417 | 5/1995 |
| JP | 09-265421 | 10/1997 |
| JP | 2000-163306 | 6/2000 |

(Continued)

OTHER PUBLICATIONS

Welsh et al. "Linux Installation and Getting Started", Jan. 1, 1998.*

(Continued)

*Primary Examiner* — Khanh Pham
(74) *Attorney, Agent, or Firm* — Lucas & Mercanti, LLP

(57) ABSTRACT

A computer file management system allowing at least one of one file (F1) and/or one directory (D3) to belong to two or more directories (D1, D2). The file management system is characterized in that a file or directory specified by an operator of the computer or the program operating on the computer as an object to be operated has all the directories present on the directory path as parent directories. This system is a novel file management system capable of classifying/organizing files and directories more easily and naturally in the conventional system without requiring additional operation.

10 Claims, 9 Drawing Sheets

FOREIGN PATENT DOCUMENTS

| | | |
|---|---|---|
| JP | 2002-132438 | 5/2002 |
| JP | 2002-140220 | 5/2002 |

OTHER PUBLICATIONS

Gifford et al., "Semantic File Systems," ACM SIGOPS Operating Systems Review, Proceedings of the thirteenth ACM Symposium on Operating Systems Principles SOSP '91, vol. 25, Issue 5, p. 16-25, 1991.

Min et al., "A New Approach to File Directory Systems," Dai 49 kai (Heisei 6 Nen Koki) Zenkoku Taikai Koen Ronbunshu (4), Information Processing Society of Japan, Sep. 30, 1994, p. 4-73 & 4-74.

Levine et al., UNIX for Dummies, Dec. 1994, IDG Books, p. 302-306.

Wall et al., Programming Perl: There's More Than One Way to Do It, O'Reilly Press, p. xv, 867, 887-893, Jul. 2000.

International Search Report Dated Dec. 24, 2003 issued by the JPO International Searching Authority in a related International Application No. PCT/JP03/11289/001807.

* cited by examiner (a) Working Directory = /doc/golf (b) Working Directory = /doc (a) Working Directory = /doc/golf/tennis (b) Working Directory = /doc/golf/tennis

METHOD FOR MANAGING FILE USING NETWORK STRUCTURE, OPERATION OBJECT DISPLAY LIMITING PROGRAM AND RECORDING MEDIUM

CROSS-REFERENCE TO RELATED APPLICATIONS

This is a divisional of U.S. patent application Ser. No. 10/513,974 filed Nov. 9, 2004, which is an application under 35 USC 371 of International Application PCT/JP2003/011289 filed Sep. 3, 2003, which claims priority of Japanese Patent Application No. 2002-259635 filed Sep. 5, 2002, the entire disclosure of each of which is incorporated herein by reference.

TECHNICAL FIELD

The present application relates to a system or method for managing files using a network structure applicable to operating systems (Oss) and application programs.

BACKGROUND ART

Conventional file managing systems use a tree structure to classify and organize files. The ends (leaf nodes) of the tree structure represent files. The branch points (nodes) of the tree structure are called directories (sometimes also referred to as "folders").

A tree-structured file management system is a hierarchical file management system starting from a root directory (the trunk of the tree structure, represented by a backslash character "/") as shown in FIG. 9. The directories D are indicated by dashed-line boxes and the files F are indicated by solid-line boxes. The y-th directories that are located x levels below the root directory are represented in the form of Dxy and files are represented in the form of Fxy. The arrows represent parent-child relationships. For example, "X→Y" represents that X is the parent directory of Y, viewing from Y, or Y is a child directory or child file of X, viewing from X.

In a tree structure, every directory or file has one directory (parent directory) at one level above it in a hierarchy.

However, there is only one exception: the directory that has no parent directory (namely the top directory) is called the "root directory."

FIG. 8(*a*) shows an example of a simple tree-structured file management system. The directories "doc" and "bin" are located at the level immediately below the root directory ("/"), the directories "tennis" and "golf" below the directory "doc", and the directories "tennis" and "golf" are below the directory "bin."

Directories having the same directory names "tennis" and "golf" but different parent directories are treated as different directories. In a tree-structured file management system, every directory or file is expressed by a name beginning with the root directory to uniquely identify it.

A route (a listing of directories) for specifying a particular directory or file in this way is called a directory path (sometimes simply called a "path").

In other words, a "directory path" can be defined as a listing of the names of the directories that leads from a directory to a file or another directory in a tree structure.

For example, the path for identifying the file "rule" in the tree structure shown in FIG. 8(*a*) is "/doc/tennis/rule." path can be represented as an absolute path (full path) or a relative path. The term "path" as used herein refers to an absolute path (namely a directory path from the root directory).

Tree structures are intuitive to understand and allow for systematic classification and organization, therefore are widely used as today's computer file management systems.

Patent Document 1 given below describes a non-tree-structured file management system in which one file can belong to more than one directory.

Patent Document 2 describes a method in which inclusive relations between file groups are registered. Once a file is registered in any of the groups, the inclusive relations between the file groups are referred to and the file is also registered in another related group.

Patent Document 3 describes a configuration including the steps of providing virtual management file that associates a virtual directory name with a higher-level virtual directory, a lower-level virtual directory, the path to a directory for storing existing files, and a file name. When an instruction to create a virtual directory is issued, the step of creating a record in the virtual management file, setting a virtual directory name, and setting it in one of the higher-level virtual directory or lower-level virtual directory are provided.

Patent Document 4 describes a method in which an "attribute" is assigned to a file and the file is designated by a logical expression of the attribute and another method in which the attribute is treated as a directory to form a tree-structured directory.

The following Patent Documents are related technical documents for illustrating the background of the present invention.

Patent Document 1: Japanese Patent Laid-Open 63-124147 (the lower left part of page 2)

Patent Document 2: Japanese Patent Laid-Open No. 9-265421 (paragraph 10)

Patent Document 3: Japanese Patent Laid-Open No. 2002-140220 (paragraphs 6 and 7)

Patent Document 4: Japanese Patent Laid-Open No. 2002-132438 (paragraphs 9 and 16)

However, increasing the number of levels in traditional tree-structured file management systems leads to longer paths, which complicates the input operation.

If an operator does not remember the directory path of a file to operate, the operator must search all directories for the file in the worst case.

Furthermore, careful consideration is required in order to create an easy-to-use tree structure even if the depth of its hierarchy is shallow, because classifying directories and files at different levels with no parent-child relationship but more than one classification criterion into a conventional tree structure inevitably produces parent-child relationships between the different levels.

For example, if (i) a set of text files, (ii) a set of binary files, (iii) a set of files relating to tennis games, and (iv) a set of files relating to golf games are stored in directories "doc," "bin," "tennis," and "golf," respectively, then a file management system can be built with any of the schemes shown in FIGS. 8(*a*) and 8(*b*) However, because these files are classified according to criteria with no semantic inclusive relations, both schemes have disadvantages.

There is no parent-child relationship between the directory names "tennis" and "doc" in nature such as "mammals" and "dog." Both of the classifications in FIGS. 8(*a*) and 8(*b*) are unnatural. As partial workaround for this, an approach to providing links (sometimes referred to as defining "aliases") is known.

However, such links must be defined by an operator one by one and it is difficult to provide links to allow files to be classified from various points of view. Another problem is that when a real directory or file is relocated, its links will be broken.

The method described in patent document 1 is not adequate for classifying a large number of directories and files because a directory cannot belong to more than one directory.

The method described in patent document 2 has a problem that if a user creates group A, registers file B in group A, creates group C, defines that group C belongs to group A, and registers file D in group C with the same file name as that of file B, file B will be overwritten by file D, unbeknown to the user.

In particular, if a relationship indicating that "doc" includes "tennis" has been registered and a file relating to "tennis" but not to "doc" is registered in "tennis," the file that does not relate to "doc" would be unintentionally registered in the group "doc". Therefore, careful consideration is required when registering an inclusive relationship between groups.

If the method described in patent document 3 is used, creation of virtual directories places a burden on an operator. If the operator creates a virtual directory, "doc," the operator must find the files one by one to include in the directory "doc" that are scattered through real directories and place them in the virtual directory "doc."

Furthermore, when a real directory or real file is relocated, inconsistencies may arise in the correspondences between real directories and virtual directories unless the relocation is properly reflected in the virtual directory. Consequently, it may be possible that the file cannot be reached from the virtual directory.

The method described in patent document 4 is not capable of classifying or organizing a large number of attributes defined. Furthermore, no "attributes" "directories" amounts to the same thing a traditional tree structure and therefore cannot solve problems with tree structures.

An object of the present invention is to solve these problems with the prior art and provide a novel file management system capable of classifying and organizing files and directories more easily and conveniently than in the conventional system without requiring additional operations.

DISCLOSURE OF THE INVENTION

File Management System

In order to solve the above-described problems, a first file management system according to the present invention allows at least one of one file (F1) and/or one directory (D3) to belong to two or more directories (D1, D2), characterized in that a child file or child directory (to be operated) in a working directory specified (defined) by a given directory string belonging to the file management system has as parent directories all the directories included in the directory string constituting the working directory (that is, the object to be operated is defined as such a directory or file).

A second file management system according to the present invention allows at least one of one file (F1) and/or one directory (D3) to belong to two or more directories (D1, D2) in a computer, characterized in that a file or directory specified by an operator of the computer or a program running on the computer as an object to be operated has all directories on its directory path as parent directories.

A third file management system allows one file (F1) and/or one directory (D3) to belong to two or more directories (D1, D2) in a computer, and is characterized in that if a file (F1) specified by an operator of the computer or a program running on the computer as an object to be operated is the only file that has at least one of the directories on its directory path as a parent directory, the file (F1) becomes the object to be operated.

In conventional tree-structured file management system, one child directory or one child file is not allowed to have more than one parent directory. In contrast, in a network-structured file management system such as the first to third file management systems according to the present invention, each file or directory can have a parent-child relationship with more than one directory or file. Furthermore, because a file or directory having as parent directories all directories included in a directory string constituting the working directory as parent directories becomes an object to be operated, or a file or a directory having as parent directories all directories on a directory path becomes an object to be operated, more than one path for specifying a directory or file to be operated can be defined. Consequently, a higher flexibility in path selection can be provided and files and directories can be managed more easily and conveniently than in conventional file management systems.

To specify a particular file in a conventional tree structure, the unique directory path from the root directory to that file must be specified. Therefore, if a file designated by a program is mistakenly moved by an operator to a different directory path in the conventional system, the file moved can no longer be found.

In contrast, the third file management system according to the present invention allows such a relocated file to be found by using a directory path designated by the program as a clue if at least a portion of the directory path remains.

When a new directory (D6) is created in the first file management system according to the present invention, preferably a child directory (D6) having as parent directories all directories included in the directory string (D1:D2:D3) constituting the working directory (for example [/D1/D2/D3]) is created.

When a new directory (D6) is created in the second or third file management system according to the present invention, preferably a child directory (D6) having as parent directories all directories (D1, D2, and D3) on the directory path (f example [/D1/D2/D3]) that specifies the new directory is created.

When a new directory is created in a conventional tree-structured file management system, a child directory having only the last directory in the directory string constituting the working directory (for example, D3 if the working directory is [/D1/D2/D3]) as its parent directory would be created.

Because the first to third file management systems according to the present invention have a kind of a network structure in which a directory is allowed to have more than one parent directory, a parent-child relationship with only one directory would be insufficient.

Therefore, providing a number of parent-child relationships as described above increases the flexibility of path selection. Thus the files and directories can be managed more easily and conveniently than in conventional systems.

Preferably, when a directory is deleted from the first file management system according to the present invention, parent-child relationships between the directory (D6) specified by the argument of a command and all directories (D1, D3) included in the directory string (D1:D3) constituting the working directory (for example [/D1/D3]) are eliminated. However, if a parent-child relationship between a directory (D2) that does not constitute the working directory and the directory (D6) specified by the argument remains, the parent-child relationship with that directory is not eliminated but maintained.

Thus, not all parent-child relationships are immediately eliminated, depending on the working directory. If at least portion of information about parent-child relationships remains, a file or directory can be reached from the remaining path.

However, if all parent-child relationships are eliminated and a directory is isolated, the directory itself is removed from the system (in fact, it is not necessarily physically removed but may be moved to another location, which relocation is also assumed to be "removal").

If directories ([/D1/D3/D6]) specified by a directory path (for example [/D1/D3]) and a directory to be removed (for example [D6]) is removed in the second or third file management system according to the present invention, the parent-child relationship between each of the directories (D1 and D3) on the directory path and the directory (D6) to be deleted is eliminated and then, if the directory (D6) to be removed does not have a parent directory, the directory (D6) to be removed is removed. However, if the directory has at least one parent directory (for example D2) after the parent-child relationship is eliminated, the directory (D6) to be removed is preferably not removed.

Thus, not all parent-child relationships are immediately eliminated, depending on how the directory path of the directory to be removed is specified. However, if at least a portion of information about the parent-child relationships remains, the remaining directory path can be used to reach the directory to be removed.

The first file management system according to the present invention may be configured as a system in which the working directory is represented as one window in which the icons of a file and directory (folder) selected as objects to be operated are displayed in a computer system having a GUI (Graphical User Interface) environment.

This configuration can provide the system with a look-and-feel consistent with conventional tree-structured file management system having a GUI environment.

The second or third file management system according to the present invention may be configured as a system in which a directory path is provided for each window and an icon representing a file and/or directory (folder) having all directories on the directory path as parent directories is displayed in the window on a computer system having a GUI (Graphical User Interface) environment.

This configuration can provide the system with a look-and-feel consistent with conventional tree-structured file management system having a GUI environment.

List Limiting Program (List Program)

In the first to third file management systems according to the present invention, the number of files and directories to be operated drastically increases as the directory string constituting the working directory becomes shorter or the network structure (parent-child relationships) becomes complicated. Therefore, it is important that, before directories or files to be operated are listed, some listing limitations or filtering is applied to them in order to improve operability. A program for limiting the listing of objects to be operated in the working directory is effective for the file management system according to the present invention.

A first program according to the present invention preferably an operation object display limiting program performing: a first step of determining whether there is a parent-child relationship between a file and a directory to be operated in a working directory (SA1); and, if it is determined at the first step (SA1) that there is the parent-child relationship, the step of selecting the parent directory as an object to be displayed and excluding the unselected child file from the display (SA2).

A second program according to the present invention is preferably an operation object display limiting program for performing the steps of: determining whether there is a parent-child relationship between a file having as parent directories all directories on a directory path and a directory having as parent directories all directories on the directory path (SA1); and, if it is determined at the first step (SA1) that there is the parent-child relationship, selecting only the parent directory as an object to be listed and excluding the unselected child file from the display (SA2).

If the first or second program is applied to a list program for listing the names or icons of directories or files selected as the objects to be displayed, the number of files displayed as objects to be operated is reduced. Accordingly, the first or second program can facilitate file operations and provide a listing legible to an operator in a situation where there are a large number of files and directories to be operated.

A third program according to the present invention is preferably an operation object display limiting program performing the steps of: determining whether there is a parent-child relationship between a file and a directory to be operated in a working directory (SA1); if it is determined that there is the parent-child relationship, selecting only the parent directory as an object to be listed and excluding the unselected child file from the display (SA2); determining whether there is a parent-child relationship between child directories that are candidate objects to be operated (SA3); and if it is determined that there is a parent-child relationship, selecting only the parent directory as an object to be listed and excluding the unselected child directories from the display (SA4).

A fourth program according to the present invention is preferably an operation object display limiting program performing the steps of: determining whether there is a parent-child relationship between a file having as parent directories all directories on a directory path and a directory having as parent directories all directories on the directory path (SA1); and if it is determined at the determination step (SA1) that there is the parent-child relationship, selecting the parent directory as an object to be listed and excluding the unselected child file from objects to be displayed (SA2); determining whether there is a parent-child relationship with a directory having as parent directories all directories on the directory path (SA3); and if it is determined at the determination step (SA3) that there is the parent-child relationship, selecting the parent directory as an object to be listed and excluding the child directory from the display (SA4).

If the third or fourth program is applied to a list program including the step of listing the names or icons of directory or file selected as the objects to be listed (SA5), the number of files as well as directories displayed as the objects to be operated is reduced. Accordingly, the program can further facilitate file operations and provide a listing legible to an operator in a situation where there are a large number of files and directories to be operated.

Preferably, the third or fourth program is applied to a list program capable of listing selectively the first or second program and the third or fourth program. The first to fourth programs according to the program can be applied to various operating systems and application programs.

Data Structure and Recording Medium

A data structure representing a parent-child relationship between one of one file (F1) and one directory (D3) and two or more directories (D1, D2), and being referred to in the first to third file management systems according to the present invention is essential for implementing the first to third network-structured file management systems according to the present invention on an information processing apparatus such as a computer. Accordingly, a computer-readable recording medium on which the data structure is recorded is considerably useful.

Information Processing Apparatus

An information processing apparatus according to the present invention is characterized by including: a management information storing section for storing information about parent-child relationships between files and directories, information about parent-child relationships between directories and management information about each directory; a file storing section for storing file content data; an input section for inputting an instruction to operate a file or a directory; and an operating instruction executing section, in response to an operating instruction inputted from the input section, executing the operating instruction while reading and writing information stored in the management information storing section and/or file content data stored in the file storing section according to any one of the first to third file management systems according to the present invention.

The information processing apparatus can be applied to a computer or a data server, a video server, or a data backup apparatus that stores data as files and classifies and organizes the files.

BEST MODE FOR CARRYING OUT THE INVENTION

In comparison with a conventional tree structure, exemplary embodiments of the present invention will be described. In particular, the present invention uses different concepts of a working directory and an object (directory or file) to be operated than conventional ones. These concepts will be described first.

Definition of Working Directory

The working directory in a conventional tree-structured file management system is a parent directory of an object (directory or file) to be operated and is the last directory of the directory string that constitutes the working directory. Because the file management system stores the path from the root to the working directory, the directory or file located at the level immediately below the working directory can be operated without, using the directory name.

The working directory in a network-structured file management system according to the present invention is the same as the conventional one in that it means the parent directory of an object (directory or file) to be operated. However, because the file management system has a network structure, one file or directory can have more than one parent directory. Therefore, a file or directory to be operated is not limited to the last directory in the directory string constituting the working directory. Instead, all directories or files having all the directories in the directory string as their parent directories can be objects to be operated.

This will be described with respect to specific examples.

Basic Concept of the Present Invention

Figure 1:
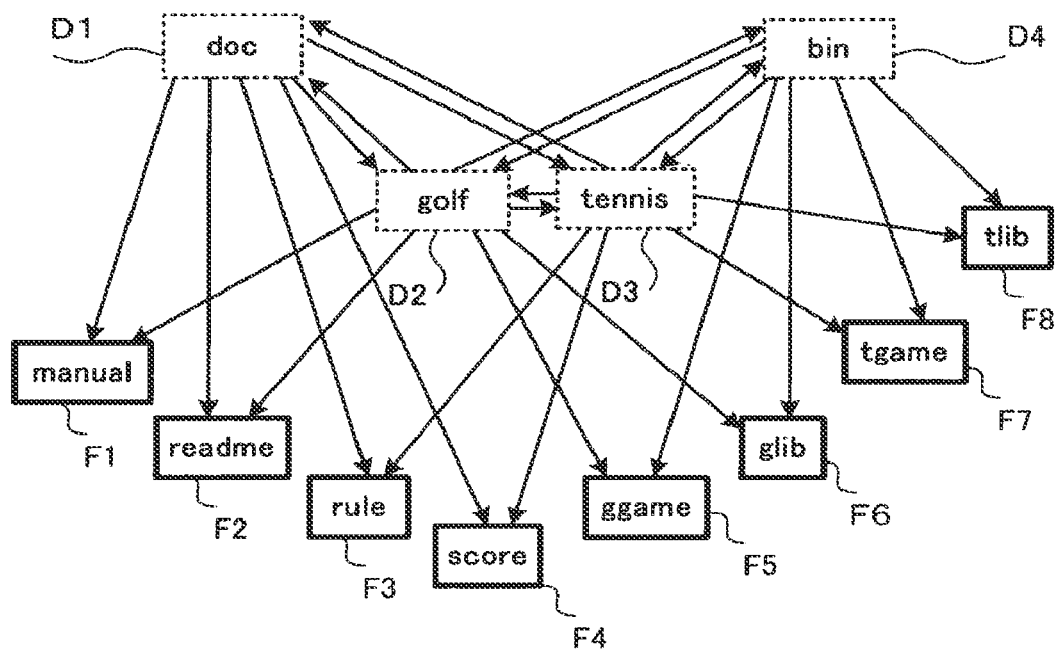
FIG. 1 shows an example of a network-structured file management system according to the present invention.

FIG. 1 shows an example of a network-structured file management system according to the present invention. Because the root directory is a parent of all files and directories but the root directory, the root directory is omitted from FIG. 1.

The directory at the base of each arrow represents the parent directory of the directory at the head of the arrow. In particular, the expression X→Y represents that the parent directory of Y (which may be a file or directory) is X. The structure differs from conventional tree structures in that one file and directory can have more than one parent directory.

Therefore, if Y is a directory, both X→Y and Y→X are allowed. In the example shown in FIG. 1, D1: "doc" is a parent directory of D2: "golf" and at the same time D2: "golf" is a parent directory of D1: "doc." Thus, a reciprocal parent-child relationship is formed between them.

Figure 8:
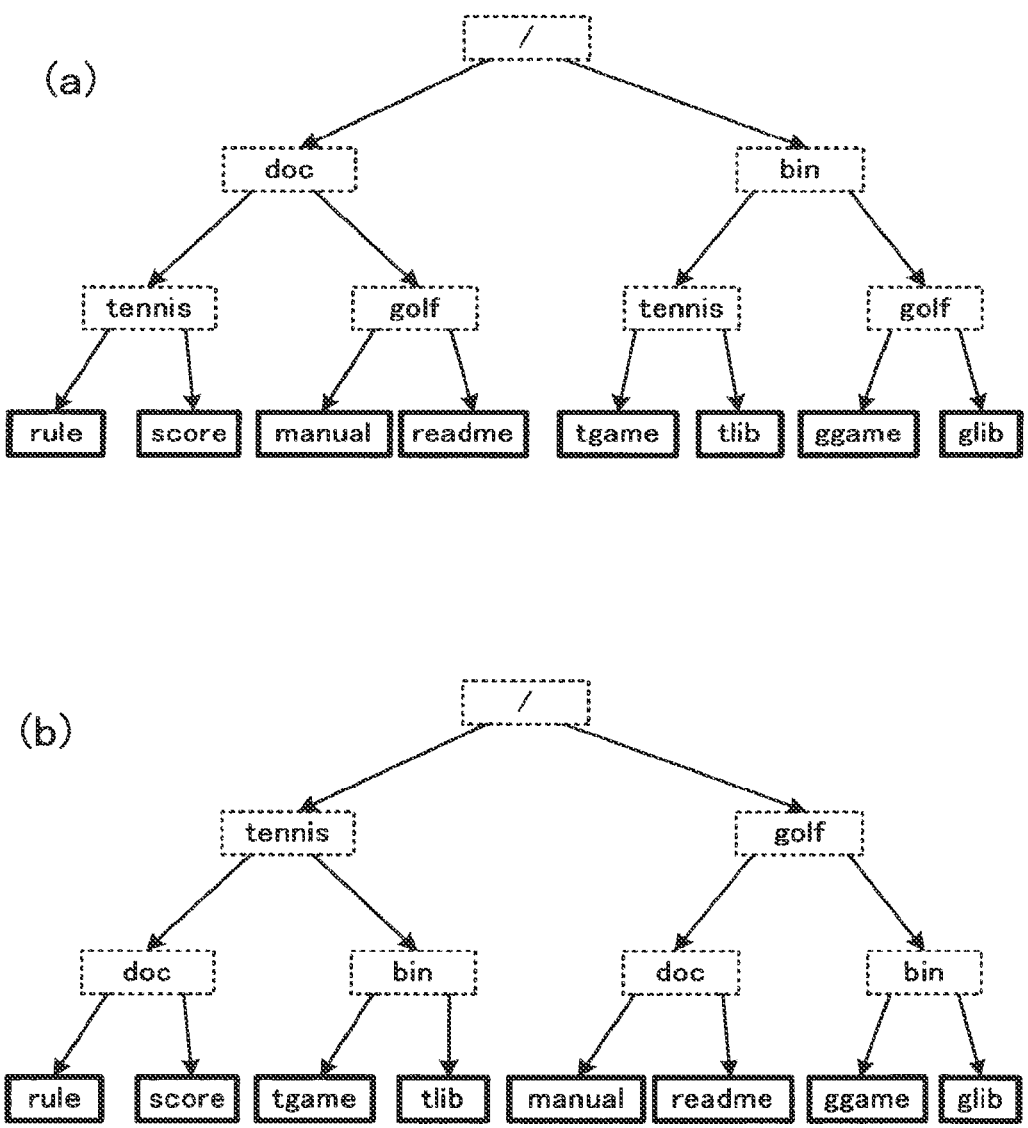
FIG. 8(a) shows an example of a simple tree-structured file management system according to the prior art and FIG. 8(b) shows another example of a simple tree-structured file management system.
Figure 9:
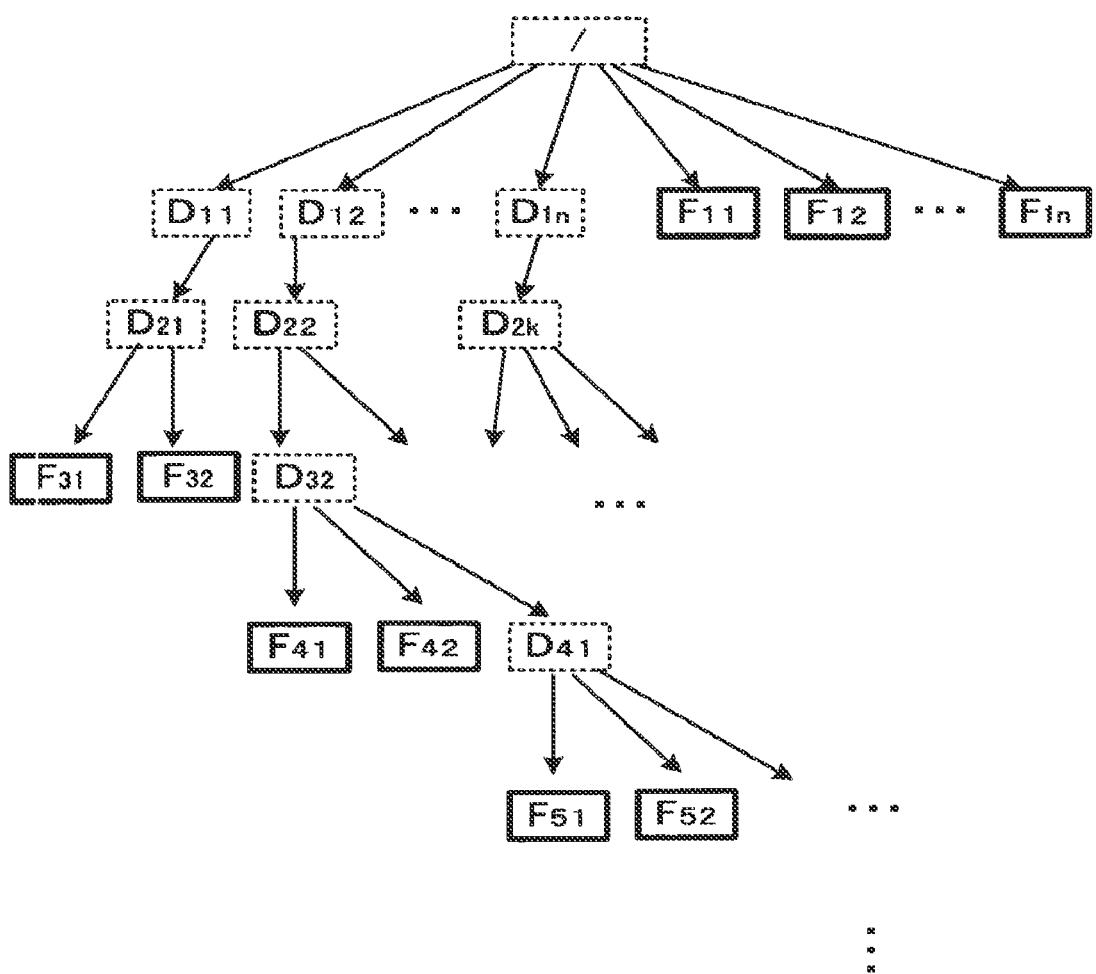
FIG. 9 is a diagram for explaining a tree-structured file management system according to the prior art.

In a conventional tree-structured file management system such as the one shown in FIG. 8(a), if the working directory is [/doc], then "tennis" and "golf" axe the only objects to be operated. To operate the file "rule," the working directory must be changed to [/doc/tennis] or the exact file path [/doc/tennis/rule] must be specified as a command argument.

In other words, only directories or files ("tennis" and "golf") whose parent directory is the last and only "doc" of the directory string [/doc] that constitutes the working directory are the objects to be operated in the conventional file management system.

In the file management system according to the present invention, directories or files having as their parent directories all the directories included in the directory string of the directory path that constitutes a working directory are objects to be operated. Specific examples of this will be described below.

First Embodiment

Example 1

Working Directory: [/doc/golf]

Figure 2:
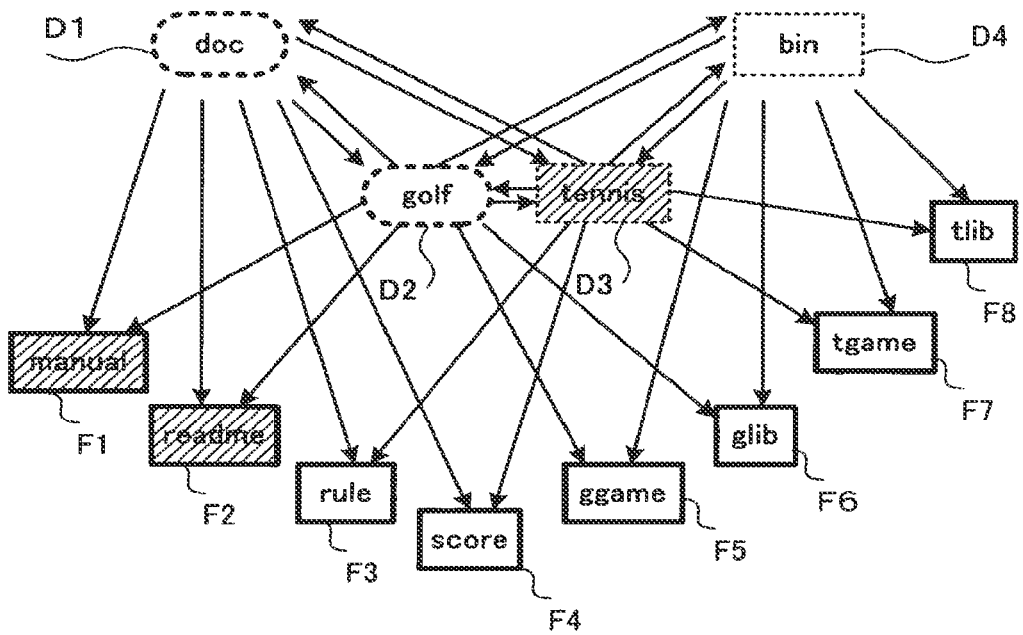
FIG. 2(a) shows a situation in the file management system according to the present invention in which the directory [/doc/golf] is the working directory and FIG. 2(b) shows another situation in which the directory [/doc] is the working directory.
Figure 2:
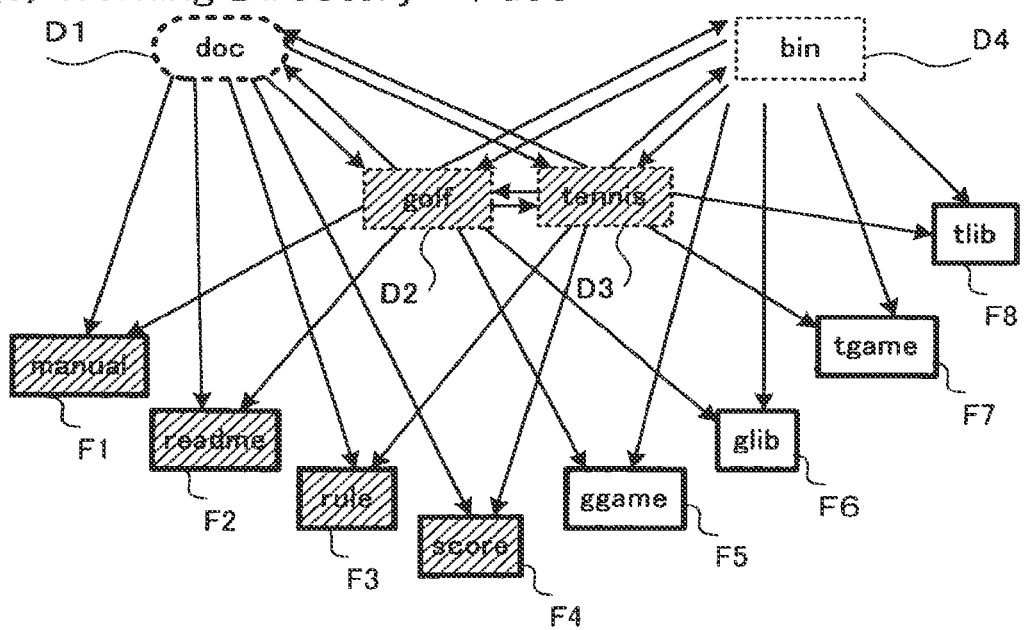

FIG. 2(a) shows a situation in a file management system according to the present invention in which the directory path constituting the working directory is [/doc/golf]. The directories or files to be operated are those having both of directories D1: "doc" and D2: "golf" enclosed in the dashed-line ovals in FIG. 2(a) as their parent directories. That is, files F1:

"manual" and F2: "readme" and directory D3: "tennis" indicated by the shaded boxes in this example in FIG. 2(a) are the objects to be operated.

Sample commands are shown below. Since the commands may vary depending on operating systems (OSs), the meanings of the commands are indicated the right. The present invention is OS-independent, therefore it is only required that the commands have the same meaning as those indicated below and the expressions of the commands make no essential difference.

Sample Command Input
% pwd (Output the working directory.)
/doc/golf
% ls (List the objects to be operated in the working directory.)
manual readme tennis Example 2

Working Directory: [/doc]

FIG. 2(b) shows a situation in the file management system according to the present invention in which the working directory is [/doc]. The objects to be operated are directories or files having the directory D1: "doc" enclosed in the dashed-line oval in FIG. 2(b) as parent directories. That is, files F1: "manual," F2: "readme," F3: "rule," F4 "score," D2: "golf," and D3: "tennis" indicated by the shaded boxes in this example in FIG. 2(b) are to be operated.

Sample Command Input
% pwd
/doc
% ls
manual readme rule score golf tennis

Example 3

Figure 3:
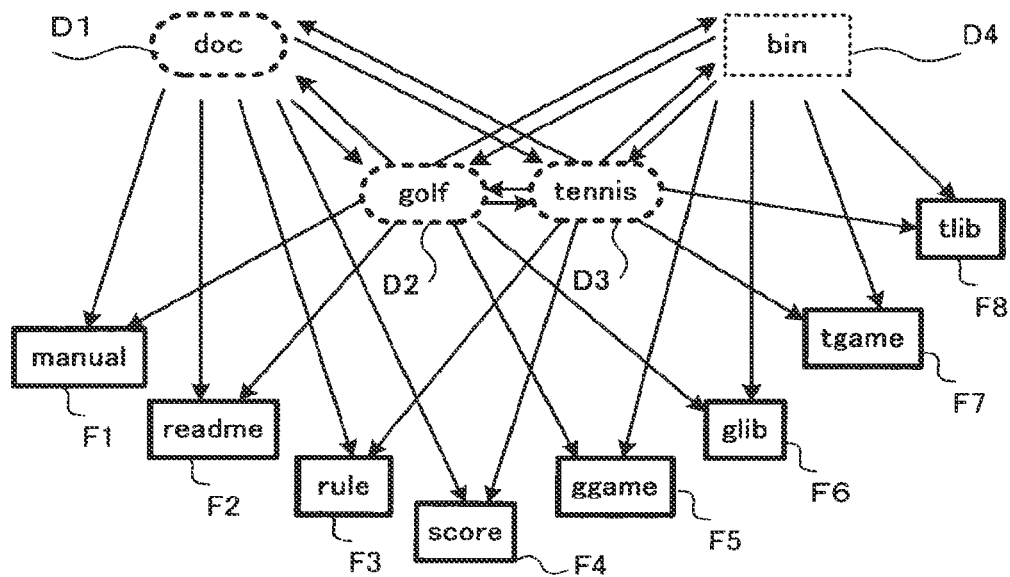
FIG. 3(a) shows a situation in the file management system according to the present invention in which the directory [/doc/golf/tennis] is the working directory and FIG. 3(b) is a diagram for explaining a command (mkdir) for creating a directory in the file management system according to the present invention.
Figure 3:
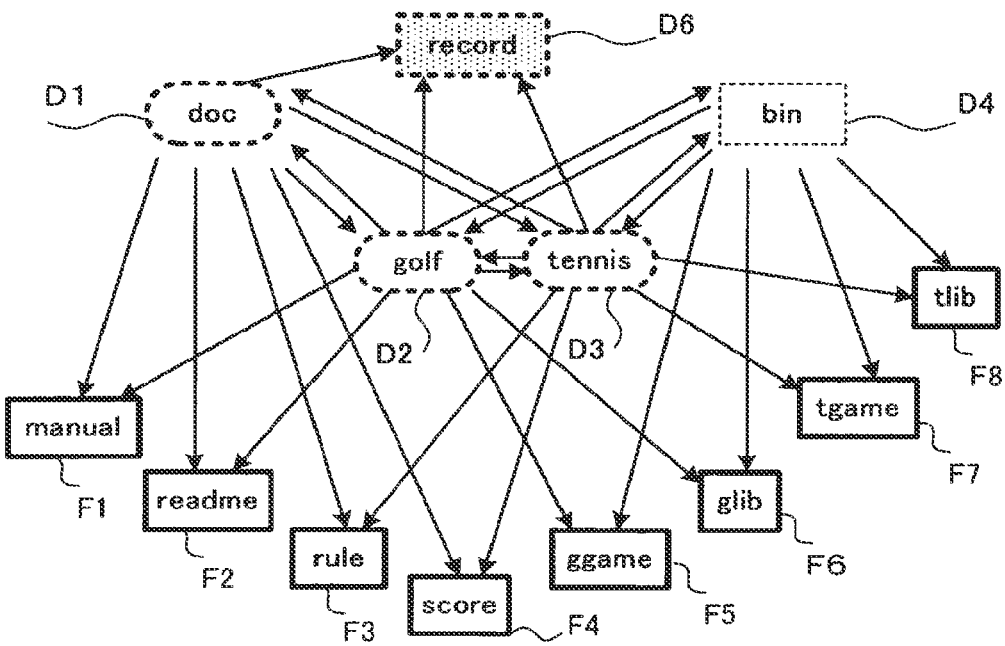

Working Directory: [/doc/golf/tennis](FIG. 3(a))

The objects to be operated are directories or files having all of the directories D1: "doc," D2: "golf," and D3: "tennis" as their parent directories. That is, there are no directories or files to be operated.

This is shown below:
% pwd
/doc/golf/tennis
% ls
"(No directories or files are printed.)"

It should be noted that if the working directory is the root (i.e. no parent directory is specified), all directories and files in the system will be the objects to be operated.

As described, in the file management system according to the present invention, the directories or files that have all the directories in a directory string (directories listed to make up the path for displaying the working directory) constituting the working directory as their parent directories become the objects of operation. Accordingly, difference in the order in which the directories are listed in a directory string does not affect the directories or files to be operated.

For example, whether the working directory is [/golf/tennis] or [/tennis/golf], the objects to be operated will be the directories or files having as parent directories both of the directories "golf" and "tennis" (i.e. the files D2: "doc" and D3: "bin").

Differences in the order in which the directories in a directory string are listed have different meanings if a relative path is specified by a command (cd) for changing working directories. A relative path is a path in which a parent directory, viewed from a working directory, is indicated by " . . . " and the working directory itself is indicated by ".". For example, if the command "cd . . . " is executed when the working directory is [/golf/tennis], the working directory is changed to [/golf]. If the command "cd . . . " is executed when the working directory is [/tennis/golf], the working directory is changed to [/tennis].

[Variation of the First Embodiment]

Another example will be described below. If an operator wants to operate the file F3: "rule" in the file management system according to the present invention shown in FIG. 1, the operator simply specifies a path consisting of a directory string containing at least one (D1 or D3) of the parent directories D1: "doc" and D3: "tennis" of the file "rule."

Because directories or files that have all directories present on the directory path as their parent directories become the objects to be operated in the file management system according to the present invention, any of [/doc/rule], [/doc/tennis/rule], [/tennis/doc/rule], [/tennis/rule], and [/rule] can be specified to operate the file "rule."

For example, to print the file F3: "rule" on a screen, any of the following commands can be used:

| | |
|---|---|
| cat/doc/rule (Print "rule.") | (Command 1) |
| cat/doc/tennis/ rule | (Command 2) |
| cat/tennis/doc/rule | (Command 3) |
| cat/tennis/rule | (Command 4) |
| cat/rule | (Command 5) |

These commands provide the same result because the arguments in effect represent the same files.

In conventional tree-structured file management systems, commands 1, 2, and 3 above would present different files because their arguments, namely paths, are different. There are techniques in conventional tree structures that use aliases or symbolic links to make different paths look like the same path in conventional tree structures. The file management system according to the present invention essentially differs in basic concept from those techniques.

Thus, the flexibility of path selection for specifying a directory or file to be operated in the file management system of the present invention is higher than in conventional tree-structure system.

Instead of making files or directories having all directories present on a directory path as their parent directories the objects to be operated, a directory path may be represented by a logical, expression in which directory names and logic symbols connecting them are used, and files or directories whose logical expressions are true may be made the objects of operation.

Second Embodiment

While the first embodiment has been described with respect to a working directory, absolute paths as described in the variation of the embodiment or relative paths from a working directory may be used for specifying files or directories. In any of these methods, the directory path from the root to a file or directory to be operated is eventually used for specifying the file or directory and the file or directory which has all directories present on that directory path as parent directories will be the object to be operated.

If a file (F1) specified by an operator of a computer containing the present system or a program running on the computer is the only file that has at least one of the directories on the directory path as its parent directory, that file (F1) may be made the object of operation.

Third Embodiment

Comparison of Data Structures

In order to implement operations described above, the file management system according to the present invention uses file management information (referred to as "file-parent-child relationship information") which associates a single file A with information about one or more directories to which the file A belongs and directory management information (referred to as "directory-parent-child relationship information") which associates a single directory X with information about one or more directories to which the directory X belongs. Parent-child relationship information for the root directory may be omitted and, if parent-child relationship information for a file or directory is empty, it may be assumed that the root directory is the only parent directory of that file or directory.

In other words, the file-parent-child relationship information and directory-parent-child relationship information are represented by data structures in which the child files or directories of each directory are listed. Alternatively, the information may be represented by a data structure in which the parent directories of each file and directory are listed. This also applies to the file-parent-relationship information.

Data strings for implementing the network-structured file management system according to the present invention illustrated in FIG. 1 will be described in comparison with data strings in the conventional tree-structured file management system illustrated in FIG. 8(a). The left-hand side of each data string represents the parent directory and the right-hand side represents the child directories.

[Data String of Conventional Directory Structure (FIG. 8(a))]
   doc: tennis, golf
   bin: tennis, golf
[Data String of Directory Structure of the Present Invention (FIG. 1)]
   doc: golf, tennis
   bin: golf, tennis
   tennis: doc, golf, bin
   golf: doc, tennis, bin.

As shown above, the file management system according to the present invention has a data structure in which each directory holds the parent-child relationship with another directory. Changing the working directory (cd command) means changing the working directory string.

Therefore, if there is a directory name (for example "shop") that is not included in a data string of the present invention as described above, the following operation can be performed.
   cd/tennis/shop
Here, files and directories that have both of the directories "tennis" and "shop" are the objects of the operation. This operation cannot be performed in a conventional tree-structured file management system and, if performed, would be handled as an error.

The file management system according to the present invention allows an application program to properly run even if the path for the application program is changed because an opera has relocated its file according to the operator's desired classification criteria, provided that the path used by the application program remains.

Fourth Embodiment

Conventional OS command operation systems can be used with the file management system of the present invention without making any modifications. Sample commands in an example in which the file management system of the present invention, is applied to the UNIX operating system will be described with respect to exemplary operations on files and directories shown in FIG. 1. Although commands may vary depending on OSs, differences in expression of the commands do not matter essentially, provided that the meanings of the commands are the same, because the file management system according to the present invention is OS-independent.

The input format of the change directory command is "cd DIRPATH." In the following description, upper-case characters represent command parameters and an operator inputs appropriate character strings in them. Furthermore, "[OPTION]" specifies an option function. The operator may input a predetermined option character, if necessary. The command "cd" changes the working directory to a directory path specified in "DIRPATH."

The input format of the print working directory command is "pwd," which prints the working directory. For example, if the "pwd" command is inputted after the command "cd/doc/golf," then [/doc/golf] is printed (see FIG. 2(a)). If the "pwd" command is inputted after the command "cd . . . /tennis" is inputted, then [/doc/tennis] is printed.

The input format of the list command is "ls [OPTION] DIRPATH." This lists the names of files and directories that have as their parent directories all directories present on a directory path specified in "DIRPATH." If the working directory is [/doc/golf] and the list command is inputted, then "manual" and "readme" are displayed (see FIG. 2(a)). If "ls/" is inputted, the names of all files and directories, except the root directory, are displayed.

An option function may be used to change the display format of files and directories, if necessary.

First Exemplary Command: Make Directory Command "mkdir"

The input format of the make directory command is "mkdir DIRPATH/DIRNAME." This creates a new directory having as parent directories all directories present on a directory path specified in "DIRPATH" by using the name specified in "DIRNAME." However, if there already exists a directory with that same name, the new directory is hot created. Instead, a parent-child relationship is set between the directory having that same name, which the child, and all the directories on the directory path specified in "DIRPATH," which will be the parents.

Referring to FIG. 3(b), the command for creating a directory (mkdir) will be described below. It is assumed here that the working directory is "/doc/golf/tennis" (that is, the command "cd/doc/golf/tennis" has been inputted):
% pwd
/doc/golf/tennis
If in this situation the command
% mkdir record (Make a directory with the name "record.")
is inputted, in the file management system according to the present invention, a child directory D6: "record" that has as parent directories all the directories in the directory string (D1: "doc", D2: "golf," and D3: "tennis") that constitutes the working directory is created (FIG. 3(b)).

[Directory-Parent-Child Relationship Information after the Directory "Record" is Created]
   doc: golf, tennis, record
   bin: golf, tennis
   tennis: doc, golf, bin, record
   golf: doc, tennis, bin, record The same method as in the case of the make directory command (mkdir) can be applied to a command for copying a file.

If the working directory is the root, the command
mkdir/doc/golf/tennis/record
can be used to obtain the same result.

Second Exemplary Command: Remove Directory Command "rmdir"

The input format of the remove directory command is "rmdir DIRPATH/DIRNAME." This command removes the parent-child relationship between a child directory with the name specified in "DIRNAME" and all the parent directories on the directory path specified in "DIRPATH." If the root directory is the only parent directory of the directory with the name specified in "DIRNAME" and there are no child files or directories after the removal, the directory with the name specified in "DIRNAME" is removed. Otherwise, it is not removed. If necessary, an Option function may be used to remove the directory with the name specified in "DIRNAME" or recursively remove child files or directories even if there are child files or directories.

Figure 4:
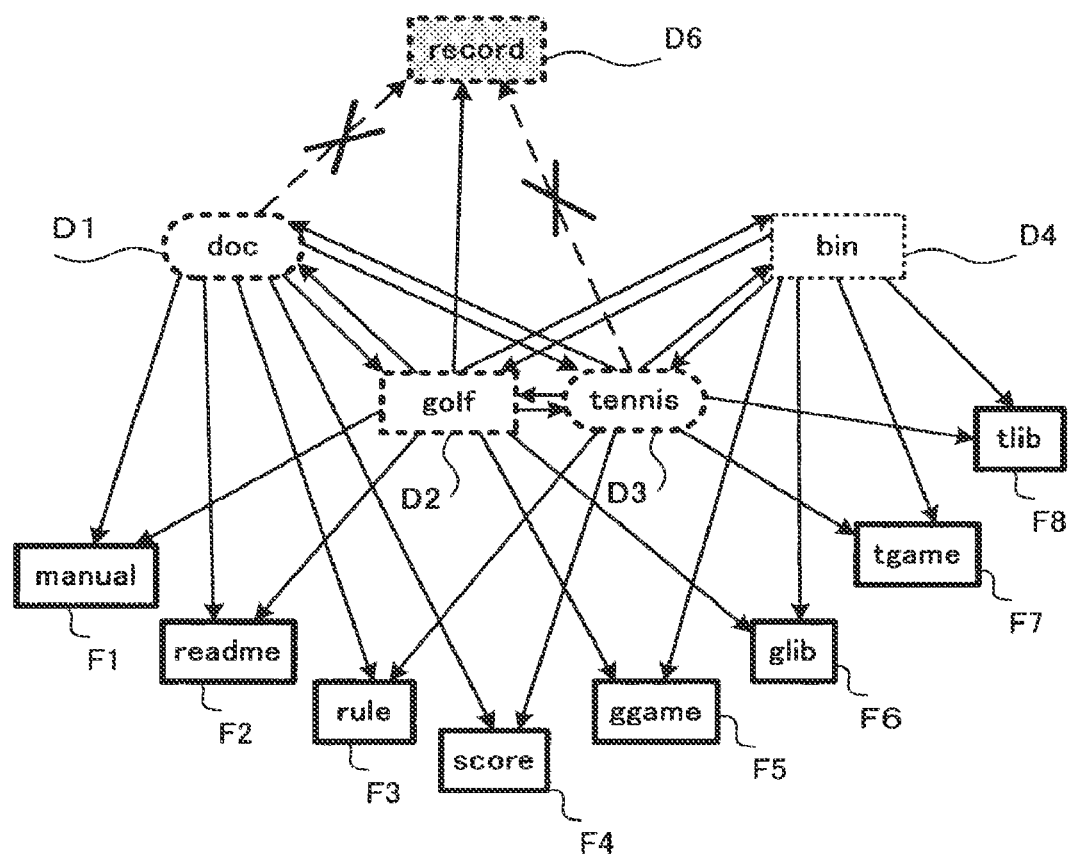
FIG. 4 is a diagram for explaining a command (rmdir) for removing a directory in the file management system according to the present invention.

Referring to FIG. 4, the remove directory command (rmdir) will be described in detail below. The rmdir command is rather complicated.

It is assumed here that the working directory is [/doc/tennis] (which is the situation immediately after the command "cd/doc/tennis" is inputted in FIG. 3(b)). That is:
% pwd.
/doc/tennis
If in this situation the command
% rmdir record (Remove the directory with the name "record.")
is inputted, then the parent-child relationships between the directory (D6: "record") specified by the argument and the directory string (D1: "doc", D3: "tennis") constituting the working directory will be removed (FIG. 4).

However, the parent-child relationship with a directory (D2: "golf") that does not constitute the working directory remains. This relationship is not removed but is maintained (FIG. 1).

[Directory-Parent-Child Relationship Information after Directory "Record" is Removed]
  doc: golf, tennis
  bin: golf, tennis
  tennis: doc, golf, bin
  golf: doc, tennis, bin, record
  If the working directory is [/doc/golf/tennis] and
% rmdir record
is executed, all parent-child relationships are removed. If a directory is isolated in this way, the directory itself is removed from the system (in fact, it is not necessarily physically removed but may be moved to another location, which relocation is also assumed to be "removal").

While the command has been described with respect to the working directory, the above description also applies to a case where a directory is specified with an absolute path or a relative path from the working directory. That is, the parent-child relationship between each of the directories on the directory path and the directory to be removed is removed.

The input format of the remove file command is "rm DIRPATH/FILENAME." This command removes a file with the name specified in "FILENAME" that has all the directories on the directory path specified in "DIRPATH" as parent directories. At the same time, all parent-child relationships with that file are also moved. If necessary, an option function may be specified to remove a directory instead of a file, confirm whether to execute a removal before the removal, or force removal despite a removal inhibit attribute attached.

The remove file command (rm) may be used in the same way as the remove directory command (rmdir). That is, instead of the directory (D6: record) to be removed, a file (for example F6: "record.txt") to be removed may be specified in FIG. 4. Experience shows that it is convenient to remove a file even if its parent-child relationship remains. Therefore, a file management system is preferable in which file is removed as a rule even if its parent-child relationship remains, unlike the case of removal of a directory.

Third Exemplary Command: Copy Command "cp"

The input format of the copy command is "cp SRCPATH/SRCNAME DSTPATH/DSTNAME." The command cp copies a file with the name specified in "SRCNAME" that has all directories on a directory path specified in "SRCPATH" as parent directories to a file with the name specified in "DSTNAME" that has all directories on the directory path specified in "DSTPATH" as parent directories. If necessary, an option function may be specified to confirm whether to execute copying before the copy, or pass the attributes of the file to be copied to the destination file. If "/./" is included in the directory path specified in "DSTPATH," all parent directories of the file specified in "SRCNAME" are assumed.

Fourth Exemplary Command: Move Command "mv"

The input format of the move command is "mv SRCPATH/SRCNAME DSTPATH/DSTNAME." This command moves a file with the name specified in "SRCNAME" that has all directories on the directory path specified in "SRCPATH" as parent directories to a file with the name specified in "DSTNAME" that has all directories on the directory path specified in "DSTPATH" as parent directories. That is, the parent-child relationship between all directories on the directory path specified in "SRCPATH" as the parents and the file with the name specified in "SRCNAME" as the child is removed, the name of the file specified in "SRCNAME" is changed to the name specified in "DSTNAME," and a parent-child relationship is set between all directories on the directory path specified in "DSTPATH" as the parents and the file with the name specified in "DSTNAME" as the child. If "/./" is included in the directory path specified in "DSTPATH," all parent directories resulting from the removal of the parent-child relationship are assumed. It should be noted that a directory may be moved as well as a file.

Operation on a File from a Program

The first to fifth (sic) exemplary commands have been described with respect to cases where an operator inputs the file operation commands. In the following description, a program running on a computer with the present file management system operates files.

If it is predetermined that only one file is specified as an argument of the open function as in the case where a file to be operated is specified by a directory path and file name, and if only one file has some of the directories on a directory path as parent directories, that file is assumed to be the object of operation. For example, if the function "open (/dira/dirb/dirc/dird/filea)" is called, determination is made as to whether "dira" has the child file "filea." If not, determination is made as to whether the next directory "dirb" has the child file "filea." If there is more than one file, determination is made as to whether there is "filea" that has both of "dirb" and "dirc" as parent directories. If there is only one such file, the file is assumed to be the object of the operation without checking for a parent-child relationship between the file and "dird."

As shown in the above example, even if the parent directory of "filea" is "dirb," it is not necessarily required that the file should have the parent directory "dira" of the directory "dirb" as a parent directory. Furthermore, if "/dira/dirb" is specified in a directory path, it is not necessarily required that the directory "dira" should be a parent directory of the directory "dirb." These are not limited to the open function but rather apply to all the commands described above.

The file management system according to the present invention allows an application program to properly run by using a directory path used by the application program if it has remained after the directory path has been changed because an operator relocated its file according to the operator's desired classification criteria.

Fifth Embodiment

In the directory structure having the network-structured file management system as described above, the number of directories and files to be operated increases drastically as the directory string of the working directory becomes shorter.

For example, there is no directory or file to be operated in Example 3 in which the directory path constituting the working directory is [/doc/golf/tennis] (see FIG. 3(a)). On the other hand, in Example 2 in which the directory path constituting the working directory is [/doc] (see FIG. 2(b)), there are as many as four files and two directories to be operated ("manual," "readme," "rule," and "score," and "golf" and "tennis").

If the same situation of Example 2 (the working directory is [/doc]) is considered in a conventional tree structure as shown in FIG. 8(a), only two directories or files, "tennis" and "golf," are to be operated and the files ("manual," "readme," "rule," and "score") below "tennis" and "golf" will not be listed by the ls command.

The following is the description of a method for placing limits on listing provided by the list command (the command for listing the names of child directories and child files belonging to a working directory) so that, if a conventional tree-structured file management system is replaced with the file management system of the present invention, a look-and-feel consistent with the conventional system is provided and a specified directory or file can be reached quickly through hierarchized directories.

A program is used for applying the following rules to the conventional ls command.

[Rule 1]: Determination is made as to whether there is a parent-child relationship between a file and a directory be listed (SA1). If there is a parent-child relationship, only the parent directory is listed and the child file of the parent directory to be listed is excluded from listing (SA2).

[Rule 2] Determination is made as to whether there is a parent-child relationship between child directories to be listed (SA3). If there is a parent-child relationship, such directories are selected and only their parent directories are listed and the child directories are not selected but excluded from listing (SA4).

Two implementations are possible, which will be detailed later. In one implementation, only rule 1 is applied to list the names of directories and files selected (SA5). In the other implementation, rule 1 is applied and then rule 2 is applied to list the names of directories and files selected (SA5). An implementation in which only rule 2 is applied without applying rule 1 is not practical.

Example of Application of Rule 1

A case where rule 1 is applied to Example 2 (FIG. 2(b)) described above will be considered first. Because there is a parent-child relationship between files (F1: "manual," F2: "readme," F3: "rule," and F4: "score") and directories (D2: "golf" and D3: "tennis") to be listed, only the parent directories (D2; "golf" and D3: "tennis") are listed and the child files (F1 to F4) of the listed directories (D2 and D3) are not listed:
% pwd
/doc
% ls (rule 1)
golf tennis As shown above, the child files (F1 to F4), which would have been listed unless rule 1 was applied, are hidden.

Because the parent directories of the child files are listed as representatives of hidden child files in this way, a smaller number of items are listed and differences in look-and-feel from the conventional tree-structured file management system can be reduced. It should be noted that the hidden files are not excluded from objects of operation. In this regard, this system is totally different from conventional tree structures.

Example of Application of Rules 1 and 2

Figure 5:
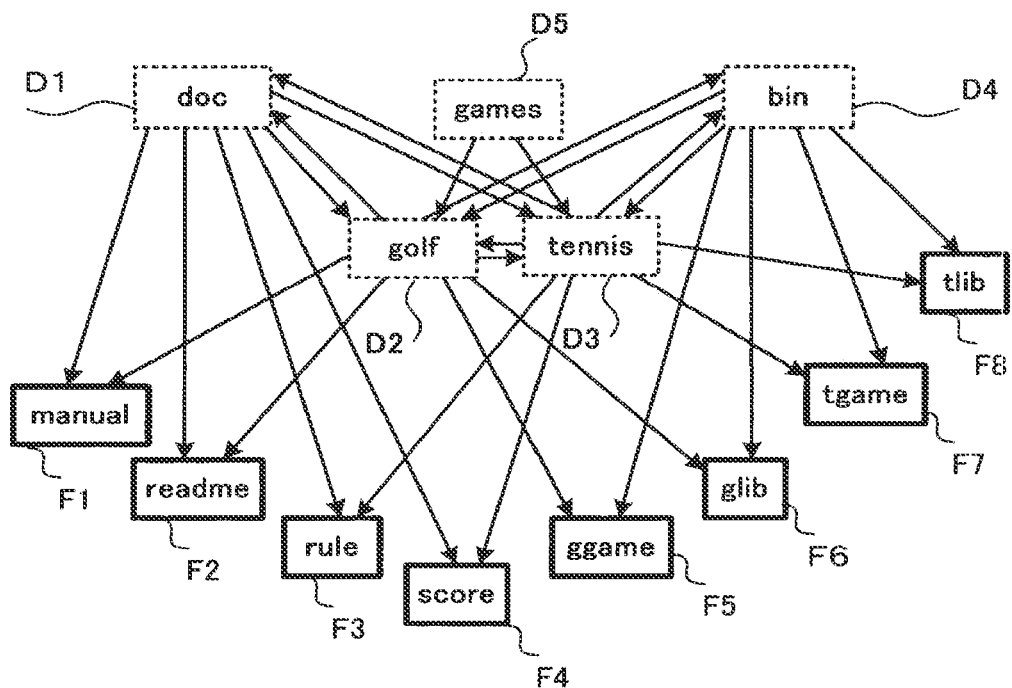
FIG. 5 shows an example in which rules 1 and 2 are applied to the ls command.

Referring to FIG. 5, an example in which rules 1 and 2 are applied to the list command "ls" will be described. If the working directory is the root directory (that is, the directory path represents the root directory) and the ls command is executed without application of rule 1, all directories and files in the file management system would be listed as the objects of an operation. This means that a vast number of items would be displayed. If rule 1 is applied, no child files are listed and only "doc," "golf," "tennis," "bin," and "games" are listed. That is, the number of items listed is reduced significantly as shown below:
% pwd
/
% ls (rule 1)
doc golf tennis bin games If rule 2 is applied here, the number of items listed will be further reduced. A parent-child relationship between child directories (D1: "doc," D2: "golf," D3: "tennis," D4: "bin," and D5: "games") to be listed is checked for. If there is a parent-child relationship (in this example, directory D5; "games" is the parent of both "golf" and "tennis"), only the parent directory ("games") is listed and the child directories ("golf" and "tennis") are not listed, as follows:
% pwd
/
% ls (rule 1+rule 2)
doc bin games The example described above is a quite simple one in which the number of directories and files are small from the start As the number of files and directories increases and parent-child relationships become complicated, a vast amount of file and directory names would be listed if the ls command is executed without listing limitation. Applying rule 1 and if necessary, rule 2 to the list command is will significantly reduce the number of files and directories listed and accordingly improve the operability.

There may be the opposite situation in which it is desirable to hide a minimum of files and directories. In such a situation, different command names may be used or appropriate switches (options) may be added to commands to differentiate between them.

Figure 6:
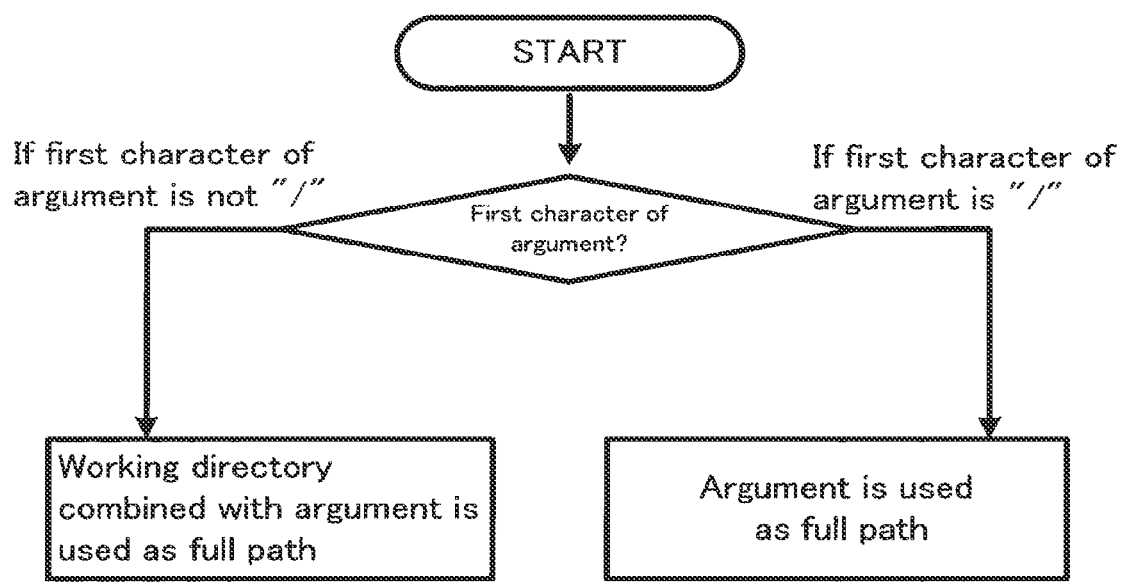
FIG. 6 is a diagram for explaining a subroutine for obtaining a full path from an argument.

For example, the command "la" may be defined as a list-all command, which is a command to execute the ls command without application of rules 1 and 2, the command "ls" may be defined as a command to execute the conventional ls command with rule 1, and the command "ls –min" may be defined as a command to execute the conventional ls command with rules 1 and 2. It should be noted that different OSs may use different command names and switches Description of Algorithm An example of an algorithm for executing the list command described above will be described below. Referring to FIG. 6, a subroutine for obtaining a full path (a directory path from the root directory) from an argument will be described first.

[Subroutine for Obtaining Full Path]

When

% command argument is executed, determination is made as to whether the argument (directory path specified by a command parameter) begins with the character "/." If so, it is determined that the argument represents a full path. If the first character of the argument is not "/" but " . . . /golf" for example, the working directory (for example [/doc]) combined with the argument ( . . . /golf), (/doc/ . . . /golf), that is, (/golf), is assumed to be the full path.

Flowchart of List Command

Figure 7:
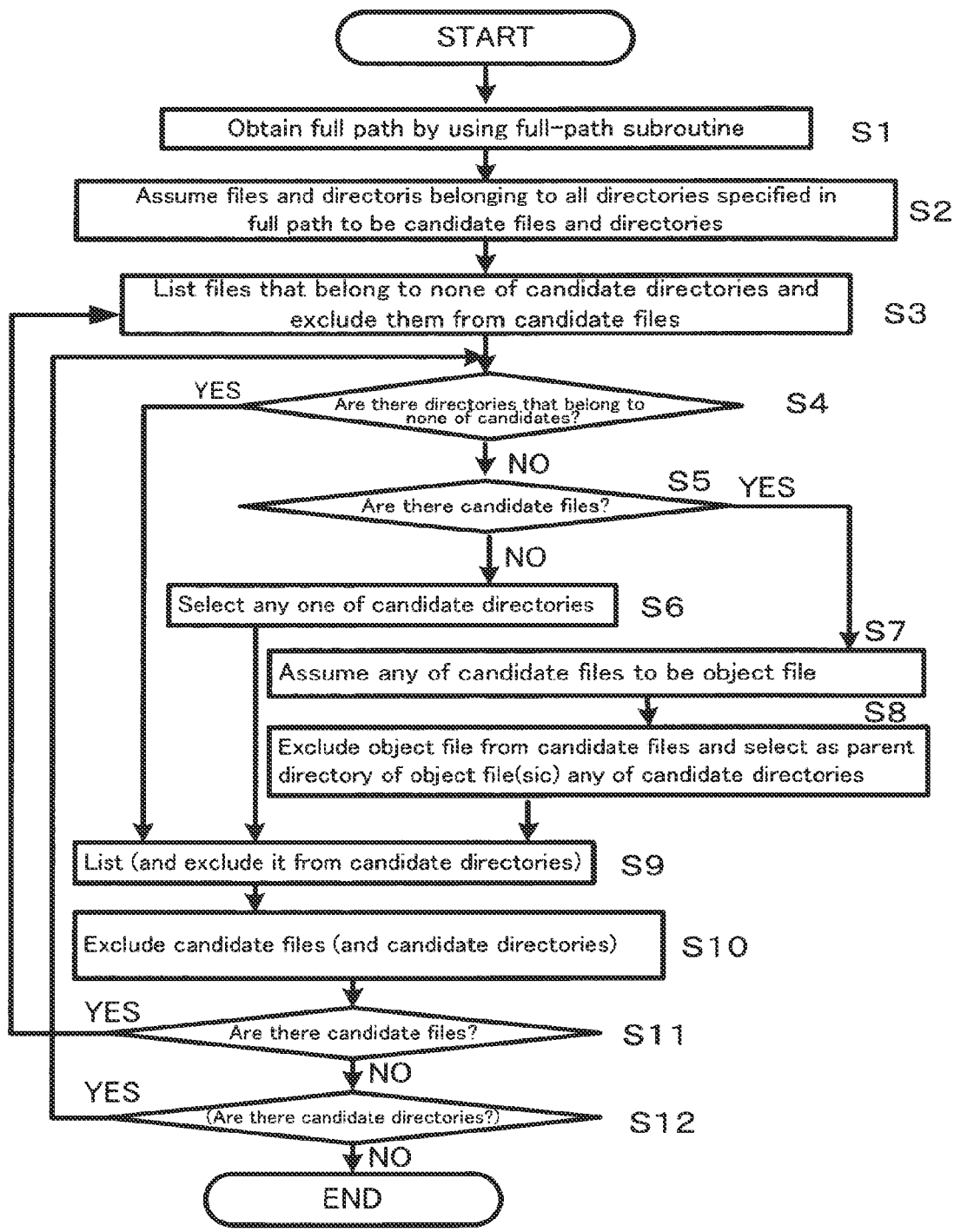
FIG. 7 shows an exemplary algorithm of the ls command to which rules 1 and 2 are applied.

FIG. 7 shows an example of an algorithm of the list command is (List files and directories to be operated.) to which rules 1 and 2 are applied.

S1 is the step of obtaining a full path from an argument by using a full-path subroutine. The algorithm described with reference to FIG. 6 may be used here. S2 is the step of selecting all candidate files and directories to be operated. If neither rule 1 nor rule 2 is applied to the list command, the process will end with listing all the files and directories selected.

S3 is the step of listing files that belong to none of the candidate directories because such files must always be listed. S4 is a step for determining whether there are directories that belong to none of the candidate directories. If "YES," then the process jumps to step 9, were those directories are excluded from the candidate directories.

S5 is the step of determining whether or not there are candidate files. If "YES," then the process jumps to step S7, where any one of the candidate files is selected as the file to be operated. If "NO," then any one of the candidate directories is selected, then the process jumps to step 9.

S8 is the step of excluding the directory to be operated from the candidate files and selecting any one of the candidate directories as the parent directory of the directory to be operated. Then, the process proceeds to S9, where the selected directory is listed and excluded from the candidate directories.

S10 is the step of excluding candidate files and candidate directories that belong to the listed directory and S11 is the step of determining whether there are candidate files. If "YES," the process jumps to S3. If "NO," the process proceeds to step S12, where determination is made as to whether there are candidate directories. If there are candidate directories, the process jumps to S4. Otherwise, the process ends.

If only rule 1 is applied, the operations in the parentheses at S9 and S10 and S12 are omitted.

While the command names in the foregoing description may vary depending OSs, these commands are OS-independent because the present invention provides a novel file management system that can be implemented independent of OS, as mentioned earlier.

Furthermore, the algorithm described in the example is illustrative only and various other algorithms are possible.

The list program with the capability of limiting the listing of objects according to the present embodiment only limits files and directories to be listed and does not exclude files or directories from the objects to be operated. Therefore, when the list command "ls" is executed and files or directories are not presented on the screen as objects to be operated, the hidden files or directories can be directly operated, provided that they are included in the objects to be operated.

Sixth Embodiment

While the embodiments have been described with respect to a command-based environment, they can be used in a GUI (Graphical User Interface) environment as well. In particular, the working directory may be represented by a window in which the icons of files and directories (folders), which would be listed by the ls command, are displayed. Furthermore, filtering rules may be presented in a pop-up menu from which operator can make a selection.

The filtering rules described with respect to the is command (rules 1 and 2 described above) can be used to display a tree view that gives a sense of compatibility with conventional ones. Also, basic commands can be used in a manner similar to conventional file operations. However, it may be difficult to move a directory without regard to parent-child relationship simply by a mouse operation.

Seventh Embodiment

The file management system described above is not limited to implementations in which it is used as a basic file management system of an operating system. The file management system can be used for application software that handles a large amount of data. For example, it can be used for programs processing and managing images and music recorded as digital data, Web page creation programs, greeting card creation programs, business card management programs, CAD programs, communication programs, navigation programs, and programs for government information disclosure services.

Eighth Embodiment

The file management system according to the present invention described above can be used for information processing apparatuses such as data servers, video serve or data backup apparatuses that store data as files and classify and organize the files, as well as a file management system for general computers.

INDUSTRIAL APPLICABILITY

As has been described, the file management system according the present invention allows files to be classified and organized in an easier, more convenient, and natural manner by using operations similar to conventional ones simply with directory and file names without needing additional operations such as defining aliases or symbolic links, creating virtual directories, coloring, annotating, or providing search keywords as in conventional computer file management systems. The present system can be used in particular as a file management system for operating systems and various application programs and is useful as a file management system for general computers as well as various other information processing apparatuses.

The invention claimed is:

1. An operation object display limiting method for a file management system performed by a computer, said file management system allowing at least one file and/or one directory to belong to two or more directories, wherein a file or directory specified by an operator of said computer or a program running on said computer as an object to be operated has all directories on its directory path as parent directories by means of extracting the directory path as the directory string between a root directory and the object from a parameter which is given by the operator or program; and a difference in the order in which the directories are listed in a directory string which consists of the parent directories does not affect the directories or files to be operated, and finding the object or the directory whose parent directories include all directories making said directory path but not necessarily requiring the parent-child relationship between said directories except for the object to be operated, said operation object display limiting method comprising: a first step of determining whether there is a parent-child relationship between a file and a directory to be operated in a working directory; and, if it is determined at said first step that there is a parent-child relationship between the file and the directory, selecting the parent directory as an object to be displayed and excluding the child file of the parent directory from display.

2. The operation object display limiting method set forth in claim 1, the method further comprising the steps of: determining, via a processor, whether there is a parent-child relationship between a file and a directory to be operated in a working directory; if it is determined that there is a parent-child relationship, selecting, via the processor, the parent directory as an object to be displayed and excluding the child file of the parent directory from display; determining, via the processor, whether there is a parent-child relationship between child directories that are candidate objects to be operated; and if it is determined that there is a parent-child relationship, selecting, via the processor, only the parent directory as an object to be displayed and excluding the child directories from display.

3. An operation object display limiting method for a file management system performed by a computer, said file management system allowing at least one of one file and/or one directory to belong to two or more directories, wherein a file or directory specified by an operator of said computer or a program running on said computer as an object to be operated has all directories on its directory path as parent directories by means of extracting the directory path as the directory string between the root director and the object from a parameter which is given by the operator or program; and the difference in the order in which the directories are listed in a directory string which consists of the parent directories does not affect the directories or files to be operated, and finding an object whose parent directories include all directories making said directory path but not necessarily requiring the parent-child relationship between said directories except for the object to be operated, said operation object display limiting method comprising the steps of: determining whether there is a parent-child relationship between a file having as parent directories all directories on a directory path and a directory having as parent directories all directories on said directories path; and, if it is determined at said first step that there is a parent-child relationship, selecting the parent directory as an object to be displayed and excluding the child file of the parent directory from display.

4. An operation object display limiting method for a file management system performed by computer, said file management system allowing at least one of one file and/or one directory to belong to two or more directories, wherein a file or directory specified by an operator of said computer or a program running on said computer as an object to be operated has all directories on its directory path as parent directories by means of extracting the directory path as the directory string between root directory and the object from a parameter which is given by an operator or program; and a difference in the order in which the directories are listed in a directory string which includes the parent directories does not affect the directories or files to be operated, and finding an object whose parent directories include all directories making said directory path but not necessarily require the parent-child relationship between said directories except for the object to be operated, said operation object display limiting method comprising the steps of: determining, via a processor, whether there is a parent-child relationship between a file and a directory to be operated in a working directory; if it is determined that there is a parent-child relationship, selecting the parent directory as an object to be displayed and excluding the child file of the parent directory from display; determining, via the processor, whether there is a parent-child relationship between child directories that are candidates objects to be operated; and if it is determined that there is a parent-child relationship, selecting, via the processor, only the parent directory as an object to be displayed and excluding the child directories from display.

5. An operation object limiting method for a file management system performed by computer, said file management system allowing at least one of one file and/or one directory to belong to two or more directories, wherein a file or directory specified by an operator of said computer or a program running on said computer as an object to be operated has all directories on its directory path as parent directories by means of extracting the directory path as the directory string between root directory and the object from a parameter which is given by an operator or program; and a difference in the order in which the directories are listed in a directory string which includes the parent directories does not affect the directories or files to be operated, and finding an object whose parent directories include all directories making said directory path but not necessarily require the parent-child relationship between said directories except for the object to be operated, said operation object display limiting method comprising the steps of: determining, via a processor, whether there is a parent-child relationship between a file having as parent directories all directories on a directory path and a directory having as parent directories all directories on said directory path; and if it is determined at said determination step that there is a parent-child relationship, selecting, via the processor, the parent directory as an object to be displayed and excluding the selected child file from display; determining, via the processor, whether there is a parent-child relationship with a directory having as parent directories all directories on said directory path; and if it is determined at said determination step that there is a parent-child relationship, selecting, via the processor, the parent directory as an object to be displayed and excluding the child directories from display.

6. A non-transient program storage device readable by a machine, tangibly embodying a program of instructions executable by the machine for performing operations of file management, said operations allowing at least one file and/or one directory to belong to two or more directories, wherein a file or directory specified by an operator of said machine or program running on said machine as an object to be operated has all directories on its directory path as parent directories by means of extracting the directory path as the directory string between a root directory and the object from a parameter which is given by the operator or program; and a difference in the order in which the directories are listed in a directory string which consists of the parent directories does not affect the directories or files to be operated, and finding the object or the directory whose parent directories include all directories making said directory path but not necessarily requiring the parent-child relationship between said directories except for the object to be operated, said operations of file management comprising: a first step of determining whether there is a parent-child relationship between a file and a directory to be operated in a working directory; and, if it is determined at said first step that there is a parent-child relationship between the file and the directory, selecting the parent directory as an object to be displayed and excluding the child file of the parent directory from display.

7. The program storage device as defined by claim 6, said operations of file management further comprising determining, via a processor, whether there is a parent-child relationship between a file and a directory to be operated in a working directory; if it is determined that there is a parent-child relationship, selecting, via the processor, the parent directory as an object to be displayed and excluding the child file of the parent directory from display; determining, via the processor, whether there is a parent-child relationship between child directories that are candidate objects to be operated; and if it is determined that there is a parent-child relationship, selecting, via the processor, only the parent directory as an object to be displayed and excluding the child directories from display.

8. A non-transient program storage device readable by a machine, tangibly embodying a program of instructions executable by the machine for performing operations of file management, said operations allowing at least one of one file and/or one directory to belong to two or more directories, wherein a file or directory specified by an operator of said machine or program running on said machine as an object to be operated has all directories on its directory path as parent directories by means of extracting the directory path as the directory string between the root directory and the object from a parameter which is given by the operator or program; and the difference in the order in which the directories are listed in a directory string which consists of the parent directories does not affect the directories or files to be operated, and finding an object whose parent directories include all directories making said directory path but not necessarily requiring the parent-child relationship between said directories except for the object to be operated, said operations of file management comprising the steps of: determining whether there is a parent-child relationship between a file having as parent directories all directories on a directory path and a directory having as parent directories all directories on said directories path; and, if it is determined at said first step that there is a parent-child relationship, selecting the parent directory as an object to be displayed and excluding the child file of the parent directory from display.

9. A non-transient program storage device readable by a machine, tangibly embodying a program of instructions executable by the machine for performing operations of file management, said operations allowing at least one of one file and/or one directory to belong to two or more directories, wherein a file or directory specified by an operator of said machine or program running on said machine as an object to be operated has all directories on its directory path as parent directories by means of extracting the directory path as the directory string between root directory and the object from a parameter which is given by an operator or program; and a difference in the order in which the directories are listed in a directory string which includes the parent directories does not affect the directories or files to be operated, and finding an object whose parent directories include all directories making said directory path but not necessarily require the parent-child relationship between said directories except for the object to be operated, said operations of file management comprising the steps of: determining, via a processor, whether there is a parent-child relationship between a file and a directory to be operated in a working directory; if it is determined that there is a parent-child relationship, selecting the parent directory as an object to be displayed and excluding the child file of the parent directory from display; determining, via the processor, whether there is a parent-child relationship between child directories that are candidates objects to be operated; and if it is determined that there is a parent-child relationship, selecting, via the processor, only the parent directory as an object to be displayed and excluding the child directories from display.

10. A non-transient program storage device readable by a machine, tangibly embodying a program of instructions executable by the machine for performing operations of file management, said operations allowing at least one of one file and/or one directory to belong to two or more directories, wherein a file or directory specified by an operator of said machine or program running on said machine as an object to be operated has all directories on its directory path as parent directories by means of extracting the directory path as the directory string between root directory and the object from a parameter which is given by an operator or program; and a difference in the order in which the directories are listed in a directory string which includes the parent directories does not affect the directories or files to be operated, and finding an object whose parent directories include all directories making said directory path but not necessarily require the parent-child relationship between said directories except for the object to be operated, said operations of file management comprising the steps of: determining, via a processor, whether there is a parent-child relationship between a file having as parent directories all directories on a directory path and a directory having as parent directories all directories on said directory path; and if it is determined at said determination step that there is a parent-child relationship, selecting, via the processor, the parent directory as an object to be displayed and excluding the selected child file from display; determining, via the processor, whether there is a parent-child relationship with a directory having as parent directories all directories on said directory path; and if it is determined at said determination step that there is a parent-child relationship, selecting, via the processor, the parent directory as an object to be displayed and excluding the child directories from display.

* * * * *